| United States Patent [19] | [11] Patent Number: 5,030,851 |
| Unternahrer | [45] Date of Patent: Jul. 9, 1991 |

[54] $(RE_xY_{1-x}Al_3(BO_3)_4$ CRYSTALS IN ELECTROOPTIC AND NONLINEAR DEVICES

[75] Inventor: Josef R. Unternahrer, Pleasanton, Calif.

[73] Assignee: Hoya Optics Inc., Fremont, Calif.

[21] Appl. No.: 553,848

[22] Filed: Jul. 13, 1990

[51] Int. Cl.$^5$ ............................................. H03F 7/00
[52] U.S. Cl. .................................... 307/425; 307/427; 372/22; 350/356
[58] Field of Search ....................... 307/425, 427, 428; 372/22, 21; 350/356

[56] References Cited

U.S. PATENT DOCUMENTS

| | | | |
|---|---|---|---|
| 3,262,058 | 7/1966 | Ballman et al. | 307/427 |
| 3,328,723 | 6/1967 | Giordmaine et al. | 307/427 |
| 3,747,022 | 7/1973 | Nanamatsu et al. | 350/356 |
| 3,949,323 | 4/1976 | Bierlein et al. | 350/356 |
| 4,826,283 | 5/1989 | Chuangtian et al. | 307/425 |

OTHER PUBLICATIONS

Chen, Chinese Lab Grows New Nonlinear Optical Borate Crystals, Laser Focus World, Nov. 1989.
Luo et al., Features and Applications of a New Self-Frequency-Doubling Laser Crystal-NYAB, SPIE, vol. 1104, 1989.
Baosheng et al., Excited Emission and Self-Frequency-Doubling Effect of $Nd_xY_{1-x}Al_3(Bo_3)_4$ Crystal, Chinese Phys. Lett., vol. 3 (1986), 411.
Dorozhkin et al., Optical Second-Harmonic Generation in a New Nonlinear Active Medium: Neodymiumyttrium-Aluminum Borate Crystals, Sov. Tech. Phys. Lett. (U.S.A.), 1, 7 (1981) 555.

*Primary Examiner*—Frank Gonzalez
*Assistant Examiner*—Susan S. Morse
*Attorney, Agent, or Firm*—Sughrue, Mion, Zinn Macpeak & Seas

[57] ABSTRACT

Crystals of compounds of the type $(RE)_xY_{1-x}Al_3(BO_3)_4$ where (RE) is a rare-earth element or absent (x=O) are optically uniaxially negative and show the linear electro-optical effect and the nonlinear optical effect. They are useful as modulators and as nonlinear optical devices such as second harmonic generators, parametric oscillators and amplifiers, and the like.

16 Claims, 1 Drawing Sheet

$(RE)_xY_{1-x}Al_3(BO_3)_4$ CRYSTALS IN ELECTROOPTIC AND NONLINEAR DEVICES

FIELD OF THE INVENTION

This invention relates to electrooptic devices and nonlinear optical devices containing single crystals of the type $(RE)_xY_{1-x}Al_3(BO_3)_4$.

BACKGROUND OF THE INVENTION

In laser technology, crystals are used for many purposes. Laser crystals are among the most common. These are crystals that can be optically pumped and then are able to amplify light of a suitable wavelength. A simple laser oscillator consists of such a laser crystal, placed between two mirrors. The two mirrors, if properly aligned, are said to form a resonator, and the optically pumped laser crystal is called the gain medium.

A second, fairly popular class of crystals are the electrooptical devices. They alter, depending on an applied electric field, the state of polarization of light passing through them. Together with polarizing devices they serve as optical modulators and ultimately as optical switches. When placed into a resonator cavity they are called Q-switches. because they switch the Q-value (Q meaning quality) of the resonator from low (oscillation inhibited) to high (oscillation enabled). There are means other than electrooptical crystals to Q-switch a laser oscillator. For example there are acoustooptic Q-switches made of $TeO_2$, $SF_{10}$ and $LiNbO_3$.

A third class of crystals are the so-called nonlinear optical crystals (hereafter sometimes referred to as nonlinear or NLO crystals). Under favorable conditions (high intensity, phase matching) they convert light of a given wavelength into light of a different wavelength. Probably the most popular of these processes is second harmonic generation, also called frequency doubling, and in the majority of cases this means converting infrared light of 1064 nm wavelength (a popular laser wavelength) into green light of 532 nm wavelength.

a. Nonlinear Optical Processes

Optical devices utilizing the non-zero components of the second order polarizability tensor to achieve second harmonic generation, parametric amplification, the addition and subtraction of frequencies (mixing), tunable frequencies, modulation and the like of coherent electromagnetic radiation have been described in U.S. Pat. No. 3.262.058 to Ballman et al., U.S. Pat. No. 3,328,723 to Giordmaine et al., U. S. Pat. No. 3,747,022 to Nanamatsu et al., U. S. Pat. No. 3,949,323 to Bierlein et al. and, most recently, in U.S. Pat. No. 4,826,283 to Chuangtian et al.

Briefly, electromagnetic waves propagating in a crystal having nonlinear optical properties induce polarization waves with frequencies which are the sum and the difference of the frequencies of the exciting waves. These polarization waves can radiate electromagnetic waves having the frequencies of the polarization waves. The energy transferred to a radiated electromagnetic wave from a polarization wave depends on the magnitude of the component of the second order polarizability tensor involved since this tensor element determines the amplitude of the polarization wave and also on the distance over which the polarization wave and the radiated electromagnetic wave can remain sufficiently in phase, called the coherence length. The coherence length is given by $\pi/(\Delta k)$ wherein $\Delta k$ is the difference between the wave vector of the radiated electromagnetic wave and the wave vector of the polarization wave. Phase matching occurs when the waves are completely in phase, that is when $\Delta k=0$. The condition $\Delta k=0$ can also be expressed as $n_3\omega_3=n_1\omega_1\pm n_2\omega_2$ wherein $\omega_3=\omega_1\pm\omega_2$ and where $\omega_1$ (signal) and $\omega_2$ (idler) are the frequencies of the incident light and $\omega_3$ (pump beam) is that of the radiated optical wave and the n's are the corresponding refractive indices. The plus signs are appropriate when the sum frequency is the one of interest the minus signs are appropriate when the difference frequency is the one of interest. A particular case which will be used as a simple example of nonlinear effects is second harmonic generation (SHG) where there is only one incident wave of frequency $\omega$ and $\omega_1=\omega_2=\omega$ and $\omega_3=2\omega$.

The above phase matching conditions can be met with birefringent crystals provided the refractive index difference between the ordinary and the extraordinary rays is sufficiently large to offset the change of refractive index with frequency, i.e., optical dispersion.

Generally phase matching is of two types:
(i) Type I, wherein the two incident waves have the same polarizations; and
(ii) Type II, wherein the two incident waves have orthogonal polarization.

Phase matching can be achieved by "tuning" the crystal in various ways such as by rotation of the crystal to vary the refractive indices, by varying the temperature, by application of an electric field, or by compositional variation. It is expected that doping YAB with one of the "functionless" rare earth elements will change the dispersion of the crystal, and hence the angle at which phase matching is achieved. The greatest thing that could happen is to achieve 90° phase matching (also called "non-critical" phase matching).

The possibility of achieving one or more types of phase matching, and the appropriate orientation of the crystal to the incident wave, depends on the existence of non-zero elements in the second order polarizability tensor. Depending on the point group symmetry of the crystal some elements will be identically zero, and equalities are imposed on other elements. The magnitude of the effects will depend on the magnitude of the non-zero elements.

There is a need in the art to provide crystals of different useful symmetry types capable of compositional variation, and preferably having non-linear electrooptic properties which are large in magnitude. It is further preferred that the crystals should be capable of phase matching in type I configuration so that the linear polarization of the fundamental radiation is preserved.

b. Nonlinear Crystals

An efficient way of obtaining second harmonic radiation from a laser is to place a crystal with nonlinear properties inside the resonator cavity. The technique of intracavity second harmonic generation, as this is called, is described. e.g., in Geusic, J. E., et al., IEEE J. Quant. Elect. QE-4,352 (1968). Conventional crystals for frequency doubling include KTP, BBO, $LiNbO_3$ and isomorphs, KDP and isomorphs, $KB_5O_8 \cdot 4H_2O$ and urea. However, KTP is very expensive and usually doubles 1.06 $\mu$ in the type II configuration. This can be a disadvantage for intracavity doubling. BBO has a low angle-acceptance and is chemically not stable. $LiNbO_3$ is easily damaged, is of poor optical quality and needs to be operated at elevated temperatures. The whole KDP family is water-soluble.

In 1981 a crystal called NYAB [$Nd_xY_{1-x}Al_3(BO_3)_4$] was reported in the USSR. A laser self-frequency-doubling effect from 1.32 μm to 0.66 μm was realized in a $Nd_{0.2}Y_{0.8}Al_3(BO_3)_4$ crystal, but it was found to be difficult to realize laser self-frequency-doubling from 1.06 μm to 0.53 μm.

Years later several institutes in China succeeded in improving the crystal growing process and obtained NYAB crystals of good optical quality and reasonable size. Lu et al. developed a multi-functional crystal $Nd_xY_{1-x}Al_3(BO_3)_4$ with highly effective laser self-frequency-doubling conversion. The $Nd^{3+}$ doped crystal was pumped with a dye laser ($\lambda = 587.9$ nm), (see FIG. 2 of Lu et al., Chinese Phys. Lett. Vol. 3, No. 9 (1986)), and improvements in pumping type were called for.

Originally, NYAB had been developed as a self-doubling crystal, i.e., a crystal that is optically pumped and generates the fundamental wavelength and its second harmonic without the need of a separate frequency doubling crystal. However, due to inherent limitations, the possible applications are drastically limited. First, the fundamental wavelength can only be 1.06 μ or 1.3 μ. Second, since the crystals are only a few millimeters in size they cannot be pumped efficiently with a flashlamp because of the size-mismatch. Thus the only practical pump sources are other lasers.

SUMMARY OF THE INVENTION

Recently, the inventors investigated the problem of selecting a frequency doubling crystal suitable for a newly developed laser. The known crystals were considered, but each of them have their known disadvantages (i.e., poor chemical stability too expensive . . .).

The present inventors then came up with the idea to use NYAB as an independent frequency doubler, i.e., to leave the generation of the fundamental wavelength to a more suitable laser crystal, and to use a NYAB crystal only as second harmonic generator. In this configuration the small size of the NYAB crystals poses no serious problem. This configuration was found to work; there was, however, a further problem: The Nd-doping in NYAB (which originally was needed to produce the fundamental wavelength) caused unwanted absorption at the second harmonic wavelength. It has now been discovered that crystals of the same yttrium aluminum borate (YAB) host structure but with Nd (or Er in the case of EYAB) removed or replaced by another rare-earth element (ion), possess useful electrooptical and nonlinear optical properties. The present invention is based on this discovery.

By eliminating the need for NYAB to produce its own fundamental wavelength, several goals are achieved.

First, the Nd-doping is not needed anymore. The undoped crystals (YAB) have a much wider transparency range than NYAB. An immediate advantage of removing the Nd-doping is a reduced absorption at 532 nm.

Second, YAB is much more versatile than NYAB. Instead of being limited to doubling the Nd-wavelengths, YAB can double all wavelengths compatible with its phase matching capability and transmission range.

Third, since YAB does not have the absorption due to Nd, it can be used for other nonlinear processes such as, e.g., optical parametric oscillators (OPO's). NYAB would not be very useful in such an application because its tuning range is severely restricted by absorption.

Fourth, the fundamental (or pump) wavelength can be produced by a device independently optimized for a given application.

Therefore, this invention encompasses such crystals and nonlinear optical devices employing the same as the nonlinear element wherein means are provided to direct at least one incident beam of electromagnetic radiation into said crystal and whereby electromagnetic radiation emerging from said crystal contains at least one frequency different from any frequency of an incident beam of radiation.

This invention also encompasses optical modulators whereby an electric field is applied to a crystal of this invention to change the polarization of a beam of electromagnetic radiation passing through the same.

In a further embodiment of the invention the YAB crystal is doped with rare earth elements other than Nd and Er, such as La, Ce, Pr, Sm, Gd, Tb, Dy, Ho, Tm or Yb. This crystal is suitable for application dependent compositional tuning, for use as a general purpose nonlinear optical device and as an electrooptical device.

Finally, a very specific application of YAB, v/z., as intracavity frequency doubler in a frequency-doubled miniature laser, is disclosed for exemplary purposes.

DETAILED DESCRIPTION OF THE INVENTION

Figure 1:
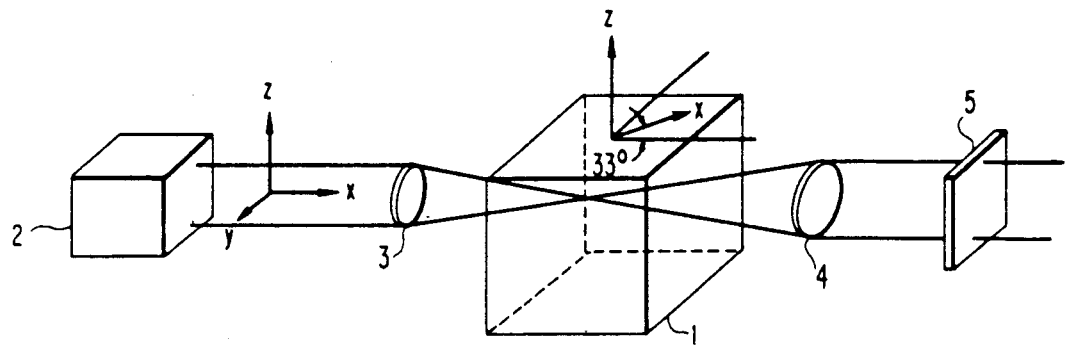
FIG. 1 illustrates a method and device for generating second harmonic radiation using a crystal of $YAl_3(BO_3)_4$.

The crystal of the present invention can be used with any laser operating at a visible or near infrared wavelength, including, but not limited to Nd:YAG lasers pumped by flashlamps or diode lasers. For example, the laser rod with which the crystal of the present invention can be used can be made of Nd:YAG which produces an output at 1.06 microns. It is also possible to use NYAB lasers, although development is in early stages. Since early 1989 NYAB crystals have been commercially available as self-frequency-doubling crystals. However, since they are limited in size (length up to 12 mm), their use is practically limited to laser-pumped devices, although scientifically feasibility of flashlamp-pumping has been demonstrated. The laser rod could alternately be made of Nd:YLF which has a longer fluorescence lifetime than Nd:YAG (480 microsec compared to 230 microsec) so that more energy can be stored. In general, the longer the lifetime of the excited states in the gain material, the greater population inversion can be stored while the Q-switch prevents lasing and the higher energy output will be obtained. Thus, longer lifetime rare earth ions could be used in place of Nd; for example, Erbium (Er) or Holmium (Ho) could be used in the laser rod.

Generally, rare earth ions that form good lasers are Nd, Er and Ho. The first of them, Nd, has been used in NYAB to produce laser beams at 1060 nm and 1320 nm (these are the two most popular Nd-lines). Both lines have also been frequency doubled in NYAB. The second rare earth element, Er, lases at ~1.5 μm in EYAB, and it is expected that it could be selfdoubled. The third element, Ho, has been used in other crystals and lases at ~2 μm. It is expected that it would work in "HYAB" as well, but these are all "selfdoubling" crystals.

The present invention represents a fundamental departure from the prior art by getting rid of the "self" and the rare earth doping and in using the undoped YAB (or functionally undoped YAB) just for doubling the output beam of an other laser.

In the present invention there is no need for the Nd-doping, and the corresponding undoped crystals, called YAB, are actually better frequency doublers than the original NYAB crystals. At the same time, removing Nd from NYAB or replacing it by another rare earth element, opens up a wide range of nonlinear optical applications for the YAB crystals, applications that are impossible for NYAB because of the NYAB absorption at the second harmonic wavelength.

Undoped YAB crystals are available from the Institute of Crystal Materials, Shandong University, PRC.

The undoped crystals (YAB) have a much wider transparency range than NYAB. An immediate advantage of removing the Nd-doping is a reduced absorption at 532 nm. It has also been demonstrated in the laboratory that YAB is much more versatile than NYAB. Instead of being limited to doubling the Nd-wavelengths, YAB can double all wavelengths compatible with its phase matching capability and transmission range. YAB is transparent from ~350 nm up to far into the infrared (we measured up to 2000 nm). Hence, it can double all lasers with a fundamental wavelength of 700 nm or longer. Some examples are ruby, Ti:sapphire, alexandrite, dye-, diode-, Nd-, and Er-lasers. The birefringence is large enough that the whole transparency range can be phase matched.

Further, since YAB does not have the absorption due to Nd, it can be used for other nonlinear processes such as optical parametric oscillators (OPO's). NYAB would not be very useful in such an application because its tuning range is severely restricted by absorption. Finally, the fundamental (or pump) wavelength can be produced by a device independently optimized for a given application.

In comparison, doped NYAB serves two functions, first, to generate radiation at the fundamental wavelength and, second, to double this radiation to the second harmonic. The first function, to generate the fundamental wavelength, can be attributed to the Nd dopant and requires optical pumping. In the present invention, on the other hand, YAB has to serve only the second function, and thus YAB does not need to be pumped since optical pumping is related to the first function (which in the present invention is left to another, independent device). It is somewhat confusing that the fundamental beam in second harmonic generation is sometimes also called the "pump beam."

While doping is not essential (it is, in fact, generally preferred that the YAB be undoped), it is possible to attain the effect of the present invention without absolutely excluding other rare earth elements, but it must be understood that these other rare earth elements do not really contribute to the functionality of the crystals as presently employed.

It is thus possible that the YAB may be doped by other rare earth elements, such as La, Ce, Pr, Sm, Gd, Tb, Dy, Ho, Tm or Yb for application dependent compositional tuning, and the resulting crystal may be used as a general purpose nonlinear optical device. The amount of the other rare earth element, represented by x in the formula $(RE)_x Y1-xAl_3(BO_3)_4$, may be from 0 to 1, and if present is preferably 0.02 to 0.95, and most preferably 0.02 to 0.2. Rare earth ions that form good lasers are Nd, Er and Ho. The first of them, Nd, has been used in NYAB to produce laser beams at 1060 nm and 1320 nm (these are the two most popular Nd-lines). Both lines have also been frequency doubled in NYAB. The second rare earth element, Er, lases at ~1.5 μm in EYAB, and it is expected that it could be selfdoubled. The third element, Ho, has been used in other crystals and lases at ~2 μm. It is expected that it would work in "HYAB" as well, but these are all "selfdoubling" crystals, and no one seems to have ever thought of getting rid of the "self" and the rare earth doping, and to use the undoped YAB just for doubling the output beam of any other laser, as we claim in our patent application.

Method of Generating Second Harmonic Radiation Using a Crystal of $YAl_3(BO_3)_4$ One aspect of this invention is directed to nonlinear optical devices employing the crystals as the nonlinear element wherein means are provided to direct at least one incident beam of electromagnetic radiation into said crystal whereby electromagnetic radiation emerging from said crystal contains at least one frequency different from any frequency of an incident beam of radiation.

This aspect is explained in greater detail by reference to FIGS. 1 and 3, although it is to be understood that the present invention is in no way limited by this exemplification. In FIG. 1 a crystal of $YAl_3(BO_3)_4$ 1 is shown oriented so that the z direction (corresponding to the c-axis of the R32 space group) is oriented vertically and the x axis (corresponding to the crystallographic a axis) is oriented at 33° to the optical path through the crystal. Polarized light of wavelength 1.06 μ from a Nd-YAG laser 2 is incident on the crystal along the optical path, the plane of polarization being parallel to the z direction. A lens 3 having a focal length of 15 cm focuses the light into the crystal. Light emerging from the crystal is collimated by a similar lens 4 passed through a filter 5 adapted to remove light of wavelength 1.06 μ while passing light of wavelength 0.53 μ. The second harmonic of the incident light emerges with its plane of polarization perpendicular to the z direction.

The critical phase matching condition (Type I), $$n^{2\omega}(\theta) = n^{\omega}_0$$

wherein $$\frac{1}{[n^{2\omega}(\theta)]^2} = \frac{\cos^2\theta}{[n_o^{2\omega}]^2} + \frac{\sin^2\theta}{[n_e^{2\omega}]^2}$$

and $$\theta = 33°$$

is satisfied by the above selection of conditions at ambient temperature.

Figure 3:
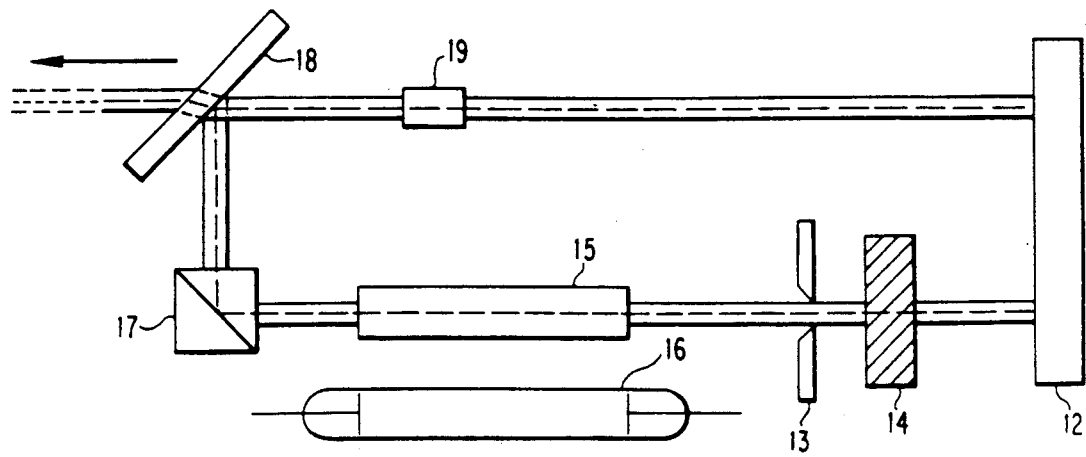
FIG. 3 illustrates how a crystal of $YAl_3(BO_3)_4$ can be used for generating second harmonic radiation inside the resonator of a laser that provides the fundamental radiation.

FIG. 3 illustrates how a crystal of $YAl_3(BO_3)_4$ can be used for generating second harmonic radiation inside the resonator of a laser that provides the fundamental radiation.

An efficient way of obtaining second harmonic radiation from a laser is to place a crystal with nonlinear properties inside the resonator, as illustrated in FIG. 3. The technique of intracavity second harmonic generation, as this is called, is described, e.g., in Geusic, J. E., et al., IEEE J. Quant. Elect. QE-4,352 (1968). In the exemplified embodiment the resonator is formed by a mirror 12 for both the fundamental and the second harmonic radiation, an optional aperture 13 to select the transverse dimension of the radiation, a Q-switch 14, a Nd-doped YAG rod 15 optically excited by a pulsed light source 16, a polarizer 17 which acts as a 90 degree deflecting mirror for linearly polarized radiation, a harmonic beam splitter 18 which acts as a 90 degree deflecting mirror for the radiation of the fundamental wavelength and is transparent for the second harmonic radiation, a crystal of $YAl_3(BO_3)_4$ 19 which converts the radiation of the fundamental wavelength to second harmonic radiation, and a mirror which coincides with the previously mentioned mirror 12. In the preferred embodiment the surface of mirror 12 is slightly concave to form a stable resonator. Optical alignment is achieved by adjusting the orientation of the polarizer 17 or the harmonic beamsplitter 18. Since $YAl_3(BO_3)_4$ phase matches in type I configuration, the linear polarization of the fundamental radiation is preserved. This is a distinctive advantage over comparable crystals of the prior art (e.g., $KTiOPO_4$) that preferably phase match in type II configuration, and where means have to be provided to restore the linear polarization of the fundamental radiation.

Method of Modulating the Intensity of a Beam of Polarized Light Using a Crystal of $YAl_3(BO_3)_4$ In some applications, pulsed laser outputs are desired. Although it may be possible to produce a pulsed laser output by pulsing the means which pump the laser rod, the preferred method of producing pulsed output is by Q-switching. A Q-switch typically an acousto-optic or electro-optic device, is positioned in the laser cavity. The crystal of the present invention is capable of operating as an electro-optic device. A Q-switch driver is operatively connected to the Q-switch. In operation, the Q-switch turns the laser off to allow a population inversion to build up as the laser rod is pumped by the laser diode. The Q-switch is then turned off, producing a high energy pulse as all the stored energy in the laser cavity is released in a short time. For pulsed operation yttrium lithium fluoride (YLF) may be the preferred laser crystal material since it stores more energy (about double) than YAG. Both frequency doubled and frequency undoubled lasers can be pulsed. As an example, a laser producing 80-100 mw IR can be frequency doubled and Q-switched to produce 50 mw average power at 100 kHz green pulses.

Figure 2:
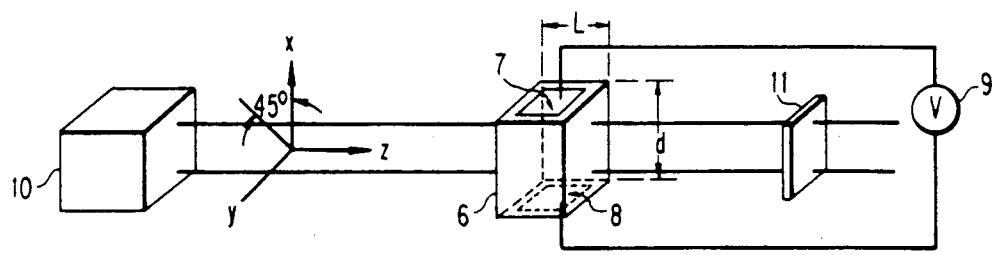
FIG. 2 illustrates a method and device for modulating the intensity of a ream of polarized light using a crystal of $YAl_3(BO_3)_4$.

In the optical modulators of the present invention an electric field is applied to a crystal of this invention to change the polarization of a beam of electromagnetic radiation passing through the same. Although the present invention is not in any way limited thereto, such an embodiment is shown in FIG. 2. In FIG. 2 a crystal cube 6 of $YAl_3(BO_3)_4$ is cut with faces perpendicular to the x, y and z axes. The cube is equipped with electrodes 7 and 8 on the two opposing faces cut perpendicular to the x axis. An electrical field is created by voltage V applied to electrodes 7 and 8, which are spaced by a distance d, from a voltage source 9. The magnitude of the voltage depends on the crystal length and the (unknown) linear electrooptic coefficient $r_{11}$. Light from a source 10 such as a Nd-YAG laser rod, polarized in the xy plane is incident on the crystal 6 which is oriented with its z axis along the optical path. Light emerging from the crystal after traveling a distance L in the crystal passes through a polarizer 11.

Upon passing through the crystal, the y component of the radiation is retarded with respect to the X component by an amount $\Gamma$ given by:

$$\Gamma = \frac{\pi L V}{\lambda d} \cdot 2 r_{11} n_o^3$$

wherein $r_{11}$ is the linear electrooptic coefficient. Polarizer 11 is set to block the exit beam at zero voltage across the crystal. Application of a voltage creates a retardation $\Gamma$ thereby permitting radiation to pass the polarizer 11. Specifically, if the applied voltage is:

$$V = \frac{\lambda d}{2 r_{11} n_o^3 L}$$

the phase retardation is $\Gamma = \pi$ and the radiation completely passes the polarizer.

A YAB intracavity frequency doubler in a frequency-doubled miniature laser, may be in the form of a high efficiency, diode pumped compact laser comprising, for example, a neodymium-YAG laser rod having a front end and a back end; a housing including means for holding the neodymium-YAG laser rod in fixed position in the housing with its front end forward; a laser diode for pumping the neodymium-YAG laser rod, having an output frequency sufficiently matched to the rod to pump the rod, secured in the housing behind and in optical alignment with the rod; output coupler means including a mirrored surface forming a front end of a laser cavity; rear mirror means forming a back end of the laser cavity, with the neodymium-YAG rod within the cavity; an intracavity frequency doubler within the laser cavity, positioned to receive the output beam of the laser rod and to halve its wavelength, doubling its frequency; and polarization control means for adjusting and maintaining the polarization of the laser beam to a polarization which optimizes frequency doubling of the laser beam by the frequency doubler. The intracavity frequency doubler is a single crystal of the present invention, i e., having the formula:

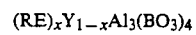

$(RE)_x Y_{1-x} Al_3(BO_3)_4$ wherein $0 \leq x \leq 1$ and (RE) is a rare-earth element other than Nd and Er.

It will further be apparent to those skilled in the art that the crystals of the present invention are useful in other devices utilizing the nonlinear properties such as type II phase matching, up and down conversion parametric amplifiers, oscillators and the like.

What is claimed is:

1. A nonlinear optical device comprising a crystal having nonlinear optical properties, and means for directing at least one incident beam of electromagnetic radiation into said crystal, whereby electromagnetic radiation emerging from said crystal contains at least one frequency different from the frequency of any incident beam of radiation, said crystal being a single crystal having the formula:

$$(RE)_x Y_{1-x} Al_3(BO_3)_4$$

wherein $0 \leq x \leq 1$ and (RE) is a rare-earth element other than Nd and Er.

2. A nonlinear optical device as in claim 1, wherein x is from 0.02 to 0.95.

3. A nonlinear optical device as in claim 1, wherein x is from 0.02 to 0.2.

4. A nonlinear optical device as in claim 1, wherein x is 0.

5. An electrooptic modulator comprising means for directing a beam of polarized radiation into a birefringent crystal, and means for applying an electric field to said crystal to change birefringence whereby the polarization of radiation emerging from said crystal is changed, wherein said birefringent crystal has the formula:

$$(RE)_x Y_{1-x} Al_3(BO_3)_4$$

wherein $0 \leq x \leq 1$ and (RE) is a rare-earth element other than Nd and Er.

6. An electrooptic modulator as in claim 5, wherein x is from 0.02 to 0.95.

7. An electrooptic modulator as in claim 5, wherein x is from 0.02 to 0.2.

8. An electrooptic modulator as in claim 5, wherein x is 0.

9. A Q-switched laser with Nd:YAG as gain medium having provided as an intracavity second harmonic generator a single crystal having the formula:

$$(RE)_x Y_{1-x} Al_3(BO_3)_4$$

wherein $0 \leq x \leq 1$ and (RE) is a rare-earth element other than Nd and Er.

10. A Q-switched laser with Nd:YAG as gain medium having provided as an intracavity second harmonic generator a single crystal as in claim 9, wherein x is from 0.02 to 0.95.

11. A Q-switched laser with Nd:YAG as gain medium having provided as an intracavity second harmonic generator a single crystal as in claim 9, wherein x is from 0.02 to 0.2.

12. A Q-switched laser with Nd:YAG as gain medium having provided as an intracavity second harmonic generator a single crystal as in claim 9, wherein x is 0.

13. A high efficiency, diode pumped compact laser comprising:
 a neodymium-YAG laser rod having a front end and a back end;
 a housing including means for holding the neodymium-YAG laser rod in fixed position in the housing with its front end forward;
 a laser diode for pumping the neodymium-YAG laser rod, having an output frequency sufficiently matched to the rod to pump the rod, secured in the housing behind and in optical alignment with the rod;
 output coupler means including a mirrored surface forming a front end of a laser cavity;
 rear mirror means forming a back end of the laser cavity, with the neodymium-YAG rod within the cavity;
 an intracavity frequency doubler within the laser cavity, positioned to receive the output beam of the laser rod and to halve its wavelength, doubling its frequency; and
 polarization control means for adjusting and maintaining the polarization of the laser beam to a polarization which optimizes frequency doubling of the laser beam by the frequency doubler,
 wherein said intracavity frequency doubler is a single crystal having the formula:

$$(RE)_x Y_{1-x} Al_3(BO_3)_4$$

wherein $0 \leq x \leq 1$ and (RE) is a rare-earth element other than Nd and Er.

14. A high efficiency, diode pumped compact laser as in claim 9, wherein x is from 0.02 to 0.95.

15. A high efficiency, diode pumped compact laser as in claim 9, wherein x is from 0.02 to 0.2.

16. A high efficiency, diode pumped compact laser as in claim 9, wherein x is 0.

* * * * *